March 13, 1962
T. G. SADLER III
3,024,681
OPTICIAN'S PUNCH PLIER
Filed Sept. 12, 1960
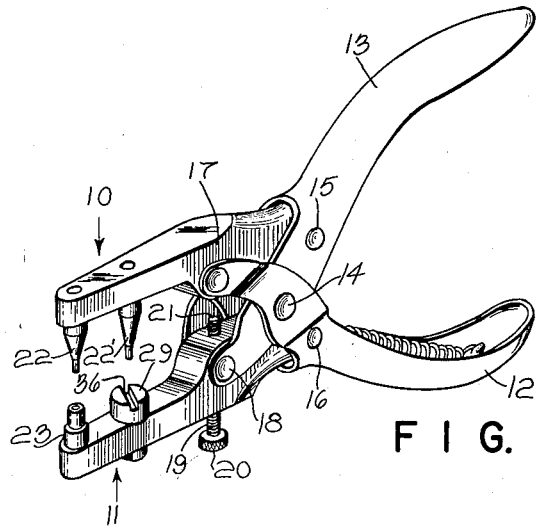
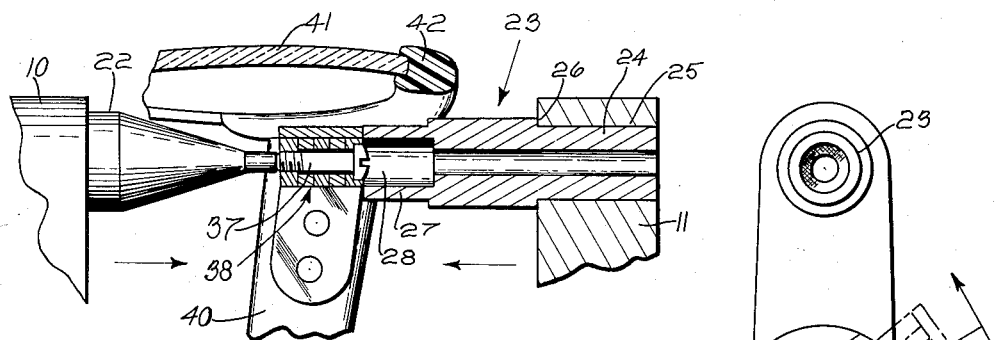
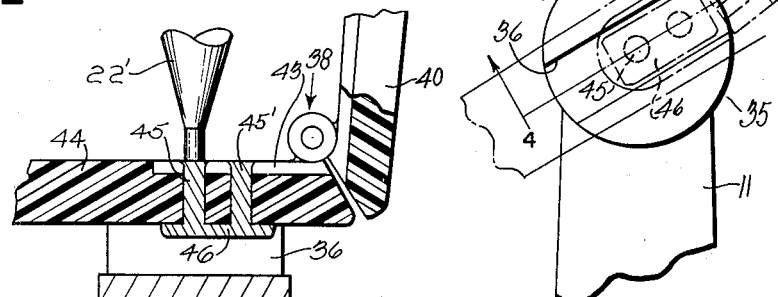
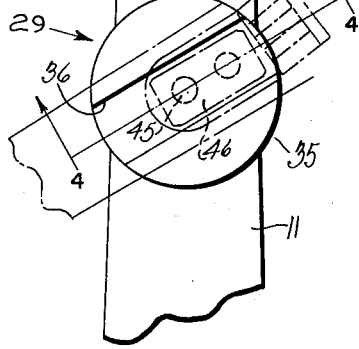
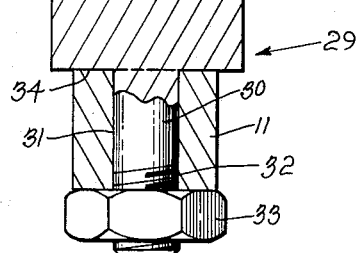
FIG. 1
FIG. 2
FIG. 4
FIG. 3
INVENTOR.
THOMAS G. SADLER, III
BY
*Barlow & Barlow*
ATTORNEYS

United States Patent Office 3,024,681
Patented Mar. 13, 1962

3,024,681
OPTICIAN'S PUNCH PLIER
Thomas G. Sadler III, Attleboro, Mass., assignor to Sadler Bros., Inc., a corporation of Massachusetts
Filed Sept. 12, 1960, Ser. No. 55,211
1 Claim. (Cl. 81—3.6)

This invention relates to a punch plier for use by opticians for the removal of screws or rivets from spectacles or other ophthalmic mountings.

Heretofore pliers which have been finished for removal of screws or rivets have been rather clumsy, and each one has been a separate unit for a unitary purpose of either removing the pintle screws from the temple hinge or for removing the rivets from the temple or frame which secured the hinge to the temple or frame there being two units for these two purposes. Further it was difficult to secure the proper angle for operation of the pliers in removing the rivets from the hinge or shields which secured them to the temple or frame.

One of the objects of this invention is to utilize a single plier with mountings upon the jaws of the plier so that one plier may be used either for removing the hinge pintle screws or the rivets in the temples or frame by selecting the proper location along the plier for the most convenient operation.

Another object of the invention is to provide an anvil for at least one of the punches which may be adjusted to receive the shield or hinge plate at various different angles which may be convenient for different ophthalmic mountings.

With these and other objects in view, the invention consists of certain novel features of construction as will be more fully described and particularly pointed out in the appended claim.

In the accompanying drawings:

FIGURE 1 is a perspective view of the plier constructed in accordance with this invention;

FIGURE 2 is a sectional view of a fragmental portion illustrating the jaws of the plier as applied for the removal of the hinge pintle screw on the hinge mounting of the temple on the frame;

FIGURE 3 is a plan view of the inside of the anvil mounting jaws showing the anvils mounted thereon and illustrating in phantom the position of a portion of an ophthalmic mounting with relation to the jaw; and FIGURE 4 is a sectional view on line 4—4 of FIGURE 3 showing the portions of the jaws and the relation of a frame to the jaws in the position for removing the rivets from the frame.

In proceeding with this invention I have utilized a pair of pliers having jaws which move toward and from each other while maintaining their parallel relation, and I have mounted upon one of the jaws two punches while on the other jaw there is mounted two anvils, one anvil cooperating with one punch and the other anvil cooperating with the other punch, and I have slotted one of these anvils and swivelly mounted the anvil so that the slot may assume various positions to accommodate the work at a convenient relative angle to the pliers.

With reference to the drawings 10 designates one jaw and 11 another jaw which are provided with handles 12 and 13 and which are pivoted together as at 14 in such a relation that the jaws move parallel to each other. This parallel relation is accomplished by slotting the jaw 10 to be guided by a pin 15 carried by the handle 13 while the jaw 11 is slotted and guided by pin 16 carried by handle 12. The handle 12 is pivoted to the jaw 10 as at 17 while the handle 13 is pivoted to the jaw 11 as at 18. A screw 19 is threaded through the jaw 11 and adjusted by the head 20 as its end 21 in a position to engage the opposite jaw 10 so as to limit the closing movement of the jaw as may be desired.

The jaw 10 carries at its outer end a punch 22 while near the outer end of the jaw 11 there is an anvil 23. This anvil 23, as shown on a larger scale in FIGURE 2, comprises a shank which is reduced as at 24 to be set into the jaw 11 in the opening 25, there being a shoulder 26 to limit the insertion. The other end of this shank of the anvil 23 is reduced as at 27 and recessed as at 28 so as to provide an opening into which the pintle screw of a hinge of an ophthalmic mounting may be forced.

Inwardly from the end of anvil 23 there is a second punch 22' on jaw 10 while inwardly from the jaw 11 there is a second anvil 29 which is reduced as at 30 (FIGURE 4) to extend through opening 31 in jaw 11. The end of this reduced portion or shank 30 is threaded as at 32 and held in position by a nut 33 which draws the shoulder 34 down snugly against the inner surface of the jaw 11. At its upper or inner end the anvil 29 is circular as at 35 and is provided with a diametrical slot 36 extending across its upper surface. This slot is of a width so as to accommodate the shield or plate of an ophthalmic mounting upon which it is to operate so that it may be forced into this slot or recess in the removal of the rivets associated therewith. By means of the cylindrical shank 30 and nut 33, this anvil 29 is swivelly mounted so that it may be adjusted to dispose its slot at any angle relative to the jaw 11.

In operation if it is desired to remove the pintle screw 37 which joins the leaves of the hinge 38 when the screws are stripped and the screw cannot be withdrawn in the normal manner, I position anvil 23 at a location so that its recess 28 is in position to receive the screw with the anvil 22 located against the threaded end of the screw the same being in a position so that the temple 40 extends in one direction and the lens 41 in its frame 42 which are at generally right angles thereto are also accommodated and then by squeezing on the handles of the punch forces the screw out of its original position into the recess and the opening is free to be retapped, for reception of another larger pintle screw in its place.

In case it is desired to remove the hinge plate 43 from the frame 44 it being used to join the temple 40 in position it is necessary to push out the rivets 45, 45' and the shield 46 which lies along the outer front surface of the frame. In this case the slot 36 in the anvil 29 is located to extend in substantially the same direction as the extent of the shield 46 which is located in this slot while the punch 22' is in engagement with one of the rivets 45 then by pressure upon the handles the punch will force the rivet outwardly and at the same time the shield 46 into the slot 36 until the engaged rivet is free from the hinge plate 43. It may be desirable to initially start one rivet 45 and then work on the other rivet 45' and alternate back and forth until the shield and its rivets are free from the hinge plate 43.

By the above arrangement it is a simple matter to operate upon either of the desired parts of an ophthalmic mounting with a single tool alternating from one to the other and by adjusting the swivel anvil 29 to the correct position to apply the plier at a convenient angle to the mounting regardless of the particular shape of the mounting which is being operated upon.

I claim:

An optician's punch plier comprising a pair of parallel jaws with handles and linkage for movement of the jaws toward each other while maintaining their parallel relation, a pair of punches carried by one jaw, and a pair of opposing circular anvils carried by the other jaw and projecting toward the first jaw, one punch and its anvil being spaced from an adjacent punch and its anvil sufficiently for independent operation and one of said anvils having a diametrical slot extending across its face and means to swively mount said slotted anvil on the jaw upon which it is carried.

References Cited in the file of this patent

UNITED STATES PATENTS

| | | |
|---|---|---|
| 203,466 | Knickman | May 7, 1878 |
| 753,224 | Bernard | Mar. 1, 1904 |
| 2,360,111 | Dedona | Oct. 10, 1944 |
| 2,615,356 | Greco | Oct. 28, 1952 |

FOREIGN PATENTS

| | | |
|---|---|---|
| 637,760 | Germany | Nov. 4, 1936 |